(12) United States Patent
Olivier et al.

(10) Patent No.: US 7,460,510 B2
(45) Date of Patent: Dec. 2, 2008

(54) RADIO GATEWAY SYSTEM AND METHOD FOR INTERFACING A RADIO SYSTEM AND AN IP NETWORK

(75) Inventors: Pierre Olivier, Gatineau (CA); Douglas Gordon Roberts, Richmond (CA)

(73) Assignee: CML Emergency Services Inc., Quebec (CA)

( * ) Notice: Subject to any disclaimer, the term of this patent is extended or adjusted under 35 U.S.C. 154(b) by 153 days.

(21) Appl. No.: 11/095,465

(22) Filed: Apr. 1, 2005

(65) Prior Publication Data

US 2006/0221912 A1 Oct. 5, 2006

(51) Int. Cl.
*H04Q 7/24* (2006.01)

(52) U.S. Cl. .................. 370/338; 370/312; 370/329; 370/338; 370/466; 370/469; 455/426.1; 455/434

(58) Field of Classification Search ............. 370/338, 370/400, 465, 468, 329, 337, 349, 352, 312, 370/466, 469, 496, 522, 467; 455/466, 434, 455/557, 426.1

See application file for complete search history.

(56) References Cited

U.S. PATENT DOCUMENTS

| | | | |
|---|---|---|---|
| 3,881,060 A | 4/1975 | Connell et al. | |
| 4,029,901 A | 6/1977 | Campbell | |
| 4,677,656 A | 6/1987 | Burke et al. | |
| 4,893,325 A | 1/1990 | Pankonen et al. | |
| 5,206,903 A | 4/1993 | Kohler et al. | |
| 5,239,570 A | 8/1993 | Koster et al. | |
| 5,311,569 A | 5/1994 | Brozovich et al. | |
| 5,392,277 A | 2/1995 | Bernstein | |
| 5,479,482 A | 12/1995 | Grimes | |
| 5,481,545 A * | 1/1996 | Maedjaja et al. | ............ 370/327 |
| 5,696,809 A | 12/1997 | Voit | |
| 5,841,848 A | 11/1998 | Dunn | |
| 5,844,974 A | 12/1998 | Ichikawa | |
| 5,862,485 A | 1/1999 | Linneweh, Jr. et al. | |
| 5,867,562 A | 2/1999 | Scherer | |
| 5,898,757 A | 4/1999 | Buhler et al. | |
| 5,905,792 A | 5/1999 | Miloslavsky | |

(Continued)

FOREIGN PATENT DOCUMENTS

CA 2306638 11/2000

(Continued)

OTHER PUBLICATIONS

IP Products White Paper; Vega Telex Signalling Product Company; Aug. 9, 2002.

(Continued)

*Primary Examiner*—Matthew D. Anderson
*Assistant Examiner*—Shaima Q Aminzay
(74) *Attorney, Agent, or Firm*—Knobbe Martens Olson & Bear LLP

(57) ABSTRACT

A radio gateway system and method for interfacing one or more radio systems and a packet network. The system comprises a plurality of gateways, each gateway including a radio interface port, a protocol converter and packet interface. The gateways convert audio and signaling from the radio system into packet signals in a generic protocol. The gateways also convert packet signals in the generic protocol into audio and signaling in a protocol understandable by a respective radio system.

25 Claims, 4 Drawing Sheets

U.S. PATENT DOCUMENTS

| | | | |
|---|---|---|---|
| 5,915,010 | A | 6/1999 | McCalmont |
| 5,937,051 | A | 8/1999 | Hurd et al. |
| 5,937,334 | A | 8/1999 | Peterson et al. |
| 5,937,355 | A | 8/1999 | Joong et al. |
| 5,940,497 | A | 8/1999 | Miloslavsky |
| 5,970,065 | A | 10/1999 | Miloslavsky |
| 5,999,965 | A | 12/1999 | Kelly |
| 6,009,163 | A | 12/1999 | Nabkel et al. |
| 6,067,356 | A | 5/2000 | Lautenschlager et al. |
| 6,075,853 | A | 6/2000 | Boeckman et al. |
| 6,128,481 | A | 10/2000 | Houde et al. |
| 6,175,562 | B1 | 1/2001 | Cave |
| 6,175,563 | B1 | 1/2001 | Miloslavsky |
| 6,175,564 | B1 | 1/2001 | Miloslavsky et al. |
| 6,185,205 | B1 | 2/2001 | Sharrit et al. |
| 6,185,287 | B1 | 2/2001 | Miloslavsky |
| 6,198,920 | B1 | 3/2001 | Doviak et al. |
| 6,233,445 | B1 | 5/2001 | Boltz et al. |
| 6,252,943 | B1 | 6/2001 | Johnson et al. |
| 6,256,489 | B1 | 7/2001 | Lichter et al. |
| 6,289,083 | B1 | 9/2001 | Ray |
| 6,292,542 | B1 | 9/2001 | Bilder |
| 6,324,279 | B1 | 11/2001 | Kalmanek et al. |
| 6,327,342 | B1 | 12/2001 | Mobley et al. |
| 6,330,324 | B1 | 12/2001 | Sabinson et al. |
| 6,332,022 | B1 | 12/2001 | Martinez |
| 6,392,999 | B1 * | 5/2002 | Liu et al. ............... 370/260 |
| 6,453,038 | B1 | 9/2002 | McFarlane et al. |
| 6,563,919 | B1 * | 5/2003 | Aravamudhan et al. ..... 379/230 |
| 6,587,545 | B1 * | 7/2003 | Antonucci et al. ........... 379/37 |
| 6,654,455 | B1 | 11/2003 | Isaka |
| 6,744,858 | B1 | 6/2004 | Ryan et al |
| 6,744,859 | B1 | 6/2004 | Koepke et al. |
| 6,771,742 | B2 | 8/2004 | McCalmont et al. |
| 6,888,803 | B1 * | 5/2005 | Gentry et al. ............... 370/259 |
| 6,963,557 | B2 | 11/2005 | Knox |
| 6,993,118 | B2 | 1/2006 | Antonucci et al. |
| 7,075,915 | B1 * | 7/2006 | Gustke ....................... 370/341 |
| 7,080,157 | B2 | 7/2006 | McCanne |
| 2001/0040887 | A1 | 11/2001 | Shtivelman et al. |
| 2001/0043586 | A1 | 11/2001 | Miloslavsky et al. |
| 2002/0001300 | A1 | 1/2002 | Miloslavsky et al. |
| 2002/0068584 | A1 | 6/2002 | Gage et al. |
| 2002/0110104 | A1 | 8/2002 | Surdila et al. |
| 2002/0197977 | A1 | 12/2002 | Brooks |
| 2003/0007469 | A1 * | 1/2003 | Daley et al. ................. 370/335 |
| 2003/0053434 | A1 * | 3/2003 | Chow et al. ................. 370/338 |
| 2003/0058827 | A1 * | 3/2003 | Chow et al. ................. 370/338 |
| 2003/0139174 | A1 | 7/2003 | Rao |
| 2003/0179772 | A1 | 9/2003 | Niklassen et al. |
| 2004/0053607 | A1 * | 3/2004 | Ronneke .................. 455/422.1 |
| 2004/0105529 | A1 | 6/2004 | Salvucci et al. |
| 2004/0184584 | A1 | 9/2004 | McCalmont et al. |
| 2004/0190468 | A1 * | 9/2004 | Saijonmaa .................. 370/312 |
| 2005/0030966 | A1 * | 2/2005 | Cai et al. .................... 370/432 |
| 2005/0090225 | A1 | 4/2005 | Muehleisen et al. |
| 2005/0201358 | A1 | 9/2005 | Nelson et al. |
| 2005/0201359 | A1 | 9/2005 | Nelson et al. |
| 2005/0201527 | A1 | 9/2005 | Meer et al. |
| 2005/0201528 | A1 | 9/2005 | Meer et al. |
| 2005/0201529 | A1 | 9/2005 | Nelson et al. |

FOREIGN PATENT DOCUMENTS

| | | | |
|---|---|---|---|
| EP | 1 054 554 | | 11/2000 |
| EP | 1 109 417 | A1 | 6/2001 |
| EP | 1 453 248 | A2 | 9/2004 |
| WO | WO 01/65868 | A1 | 9/2001 |

OTHER PUBLICATIONS

Network Access Radio; Catalyst Communications Technologies, Inc.:: Network Access Radio; pp. 1-3. http://www.catcomtec.com/index2.php?option=com_content&task-view&id=47&Itemid=... date unknown.

P25$^{IP}$ Technical Overview; P25$^{IP}$. Secure and Reliable Digital Voice and Data Communications; Tyco/Electronics, date unknown.

Wave (Wide Area Voice Environment); Twisted Pair Solutions, date unknown.

Fenner, W.; Internet Group Management Protocol, Version 2; Nov. 1997; pp. 1-22. http://www.ietf.org/rfc/rfc2236.txt, date unknown.

Deering, S.; Host Extensions for IP Multicasting; Aug. 1998, pp. 1-15. http://www.ietf.org/rfc/rfc1112.txt, date unknown.

U.S. Appl. No. 60/264,242, filed Jun. 01, 2004, Ryan et al.

Reed et al.: An Overview of the Challenges and Progress in Meeting the E-911 Requirement for Location Service. IEEE Communications Magazine, Apr. 1998. pp. 30-37.

NENA Generic Standards for E9-1-1 PSAP Equipment. NENA Technical Reference. NENA-04-001 Issue 1, Jun. 20, 1996. Prepared by: National Emergency Number Association (NENA) PSAB Standards Sub-Committee. Published by NENA. Printed in U.S.A.

NENA Recommended Generic Standards DEaling with Network Interface for E9-1-1 and Emerging Technologies. NENA Technical Reference. NENA-03-XXX Draft Issue 1.01, Jul. 13, 2000. Generic Standards for E9-1-1 and Emerging Technologies. Prepared by: National Emergency Number Association (NENA) PSAP Standards Committee. Published by NENA. Printed in U.S.A.

Panossian et al.: Towards Providing Enhanced 911 Emergency Service in IP Telephony. Department of Computer Networking, University of Missouri—Kansas City. Nov. 1998, Revised: Aug. 1999.

Schulzrinne: Providing Emergency Call Services for SIP-based Internet Telephony. Internet Engineering Task Force. Columbia U., Internet Draft. Jul. 13, 2000. Expires: Dec. 2000.

Cisco IP Telephony Network Design Guide. Cisco CallManager Release 3.0. Corporate Headquarters, Cisco Systems, Inc. San Jose, CA. Customer Order No. DOC-7811103; Text Part No. 78-11103-01.

Popovici, Edward C., et al., Consistency Support for a Decentralized Management in Close Multiparty Conferences Using SIP, The 11$^{th}$IEEE International Conference on Sep. 28-Oct. 1, 2003, Piscataway, NJ, USA, IEEE. pp. 295-300.

NENA Recommended Generic Standards Dealing with Network Interface for E9-1-1 and Emerging Technologies, NENA PSAP Standards Committee, NENA-03-XXX, Draft Issue 1.06, Sep. 17, 2000, pp. 1-1 - 12-2.

NENA Recommended Generic Standards for E9-1-1 PSAP Equipment, NENA CPE/PSAP Standards Tehnical Committee, NENA-04-001, Issue 2, Mar. 2001, pp. 1-92.

NENA Standard, Generic Requirements for an Enhanced 9-1-1 Selective Routing Switch, NENA Network Technical Committee, NENA-03-005, Jan. 2004, pp. 1-31.

E9-1-1 Systems - Product Guide, Software Release B:2.1, CML Public Safety Systems, Jul. 1999, pp. 1-1 - 17-2.

Panossian, Serge G., "A Conceptual Architecture for Enhanced 911 Emergency Service for IP Telephony", Masters Thesis presented to the Faculty of the University of Missouri- Kansas City, Dec. 18, 1997, pp. 1-50.

Zetron, "Private/Land Mobile Radio," web page including links to products, 2 pgs., web address, printed Feb. 3, 2006.

Vega, "Communications and the Best Practices in Crisis Management," web page, 1 pg., web address, printed Feb. 3, 2006.

Vega, "Viper, Custom Configurations," web page, 1 pg., web address, printed Feb. 3, 2006.

Vega, "Viper Eight, Portable Command Center Network Infrastructure," web page, 1 pg., web address, printed Feb. 3, 2006.

Vega, "Viper MCU, Self-Contained Portable Communications Command Center," web page, 1 pg., web address, printed Feb. 3, 2006.

* cited by examiner

RADIO GATEWAY SYSTEM AND METHOD FOR INTERFACING A RADIO SYSTEM AND AN IP NETWORK

FIELD OF THE INVENTION

This application relates to a radio gateway, system and method for enabling a radio system to communicate over a packet network.

BACKGROUND OF THE INVENTION

A problem particular to mobile radio dispatch systems is the distance between an operator dispatch console and RF transmission and reception equipment. This problem arises because of the necessity to position the RF equipment to ensure geographic coverage.

This problem has traditionally been addressed by remoting the connection between the dispatch console and the RF equipment over leased lines, using various multiplexing methods to combine the voice signals and the control signals over a minimum number of lines. For instance, one common method involves multiplexing a DC current over the AC voice signal, with the magnitude and polarity of the current representing a specific function that the RF equipment must perform. Another common method involves sending a precise tone sequence composed of audible tones, with the frequency of the tones again representing a specific control function. The method used depends on the type of the equipment.

In all cases, the control functions relayed using those methods pertain to basic RF equipment control. Functions pertaining to the exchange of data between the dispatch console and remote subscribers over the RF network, such as the transport of unit ID or paging addresses, are achieved by overlaying a second multiplexing protocol, such as a low bit-rate modem protocol or a second tone sequence protocol, over the voice channel established between the dispatch console and the subscriber units. This causes the following problems: first, the voice channel is already non-ideal due to the underlying signal multiplexing method (this is especially true with the tone sequence method, that reserves a portion of the audible spectrum), and second, the dispatch console needs to implement every variant of the subscriber unit data protocols.

Recently, there has been interest in the use of Voice over Internet Protocol methods to replace the leased lines used to remote the dispatch console to RF equipment link. Some commercial equipment exists today. However, this equipment aims only to replace the voice channel and multiplexed current or tone signalling with packetized voice signals and embedded control sequences, while maintaining the data signalling as a low bit-rate coding method or second tone sequence method over the packet voice channel. A dispatch console is then required to separate the control signalling from the voice signalling. This method offers the following drawbacks. First, it restricts the use of voice codecs to the types of codecs that will accurately reproduce the low bit-rate data or tone sequence. This poses a significant problem as the modern codecs are designed to model to speech tract and as such are not optimized to pass modulated data. This requires a codec using 32 kbps or more bandwidth, such as a G.726 ADPCM codec and enough bandwidth throughout the whole system to carry the combined signals. Secondly, the dispatch console must still implement all variants of the data protocols. This implies that a different interface card may be needed for each protocol.

SUMMARY OF THE INVENTION

The system and method described here, in addition to utilizing Voice over Internet Protocol techniques for audio transport, utilizes a protocol that is independent from the RF equipment control protocol or subscriber unit data protocol, and can effectively encapsulate both protocols in a generic protocol that defines all possible radio functions. As such, embodiments of the present invention allow a dispatch console to generically implement one protocol, and rely on the Radio Gateway to convert this protocol to the signals required to control the RF equipment and the signals destined to the subscriber units. Furthermore, by sending only unaltered voice in the packet voice channel, the gateway can utilize any codec, independent of the codec's capability to transport tone or data signals.

In one aspect of the present invention, there is provided a communication system for enabling a plurality of radio systems to communicate over a packet network, each radio system communicating one of at least two different radio protocols, the communication system comprising: a plurality of gateways adapted to communicate using a generic protocol; for each radio protocol of the at least two radio protocols: at least one gateway of the plurality of gateways converting audio and signalling in the radio protocol to and from audio and signalling in the generic protocol for at least one radio system that communicates using the radio protocol.

In a second aspect of the invention, there is provided a gateway comprising: a radio interface port connectable to communicate with a radio system; a packet interface operable to send and receive packet signals; and a protocol converter adapted to convert audio and signalling received from the radio system via the radio interface port into packet signals in a generic protocol and to convert packet signals in the generic protocol received via the packet interface into audio and signalling in a protocol understandable by the radio system.

In a third aspect of the invention, there is provided a method of enabling a radio system to communicate via a packet network, said method comprising: receiving audio and signalling from the radio system at a radio gateway; converting the audio and signalling into packet signals in a generic protocol; providing the packet signals in the generic protocol to the packet network for distribution to a desired destination; receiving packet signals from the packet network, said packet signals being in the generic protocol; converting the packet signals from the packet network into audio and signalling in a protocol understandable by the radio system; and transmitting the converted audio and signalling to the radio system.

BRIEF DESCRIPTION OF THE DRAWINGS

The invention will now be described in greater detail with reference to the accompanying diagrams, in which.

DESCRIPTION OF THE PREFERRED EMBODIMENTS

Various embodiments of the present invention provide a gateway, a system and a method for interfacing a radio system, such as a land based mobile radio system, to a packet network.

Figure 1:
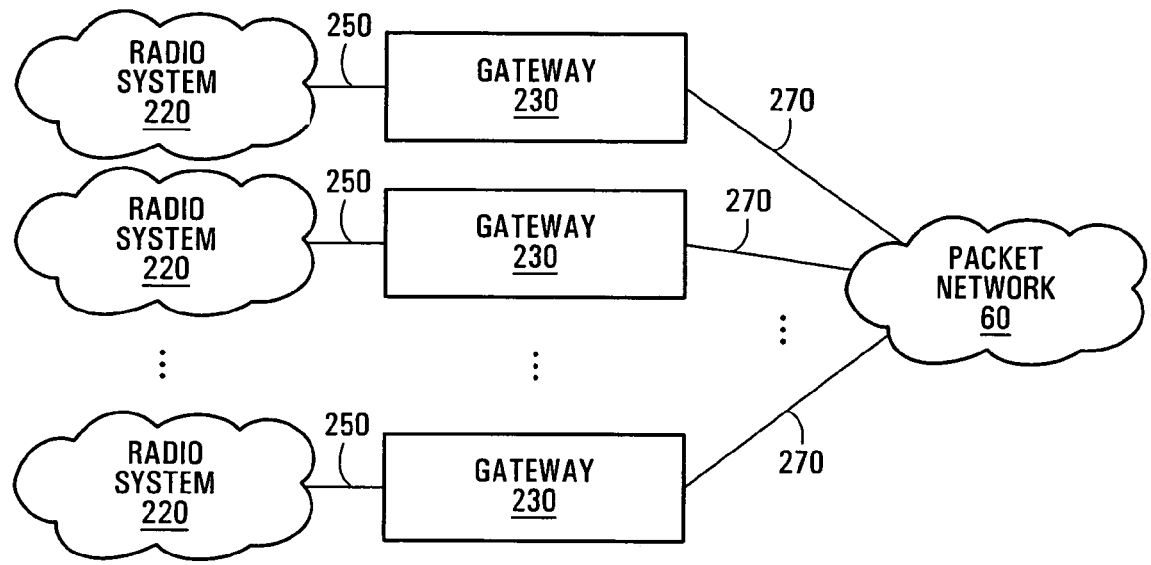
FIG. 1 is a schematic drawing of a system within which an embodiment of the present invention may be employed.

FIG. 1 is a schematic drawing of a system comprising a plurality of gateways 230 each linked to a respective radio system 220 by a respective interface 250. Link 270 connects the gateway to a packet network 60, such as an IP (Internet Protocol) network for example. The radio systems 220 generate audio and signalling using a respective native protocol. In some embodiments, multiple different native protocols are collectively implemented to radio systems 220. Examples include baseband analog audio, DC control signalling, tone control signalling, local control signalling and subscriber unit signalling. Examples of subscriber unit signalling include a data burst with unit identification information or driver status and feature enablement/disablement signals, such as a signal to disable the ignition of a stolen vehicle.

In operation, each gateway 230 takes audio and signalling from interface 250 and converts them to a generic protocol compatible for use over line 270 and sends the converted signals over link 270 for distribution over the packet network 60. The gateway 230 also does the reverse conversion of generic protocol signals received over link 270 to audio and signalling and sends the audio and signalling to the radio station 220. The generic protocol used over link 270 is the same for all of the gateways.

In some embodiments, a radio station within the radio system converts RF signals from a radio site to audio and signalling and sends the audio and signalling over interface 250 to the gateway 230. The radio station also does the reverse conversion from audio and signalling to RF signals and sends the RF signals to the radio site. In some embodiments, the radio station has a digital interface, such as a USB port, and the gateway converts the signalling to whatever format the radio station understands and sends the converted signalling over a data line to the digital interface.

In some embodiments, each interface 250 has two separate lines, one for the audio and one for the signalling. In some embodiments the audio is a baseband analog audio signal. In some embodiments the signalling is a control signal.

In some embodiments link 270 is two separate lines, one for the converted audio and one for abstracted signals. In some embodiments the converted audio is IP packet audio. In some embodiments, the IP packet audio is sent over link 270 using Voice over IP protocol.

In different embodiments the packet network 60 is a Local Area Network or Wide Area Network. An example of a WAN is the Internet. In some embodiments link 270 is an Ethernet LAN link. In other embodiments it is a WAN link.

In some embodiments, one or more of the gateways 230 are connected to the packet network 60 through respective distributed call management modules. Distributed call management modules are distributed aggregation and control points for radio, telephone, operator entities and any audio device within a communication network. A specific example of a distributed call management module is described in Applicant's copending U.S. patent application entitled "INTERNET PROTOCOL DISPATCH SYSTEM AND METHOD" and having attorney docket number 51764-2, and incorporated herein by reference in its entirety. In some of such embodiments the interface between the gateway and the distributed call management module can be a hardwired point-to-point connection. In other embodiments the interface is a LAN.

Using the gateways 230, RF systems can communicate on a packet network independent of base station and subscriber signalling protocol. The gateway extracts the signalling from the radio station and converts it to a common form. Examples of subscriber unit signalling that would go through the radio station to the gateway for conversion are: unit to unit data bursts with information such as unit identification; voice signals; a signal to disable the ignition of a stolen car; and driver status signal in a taxi cab.

Figure 2:
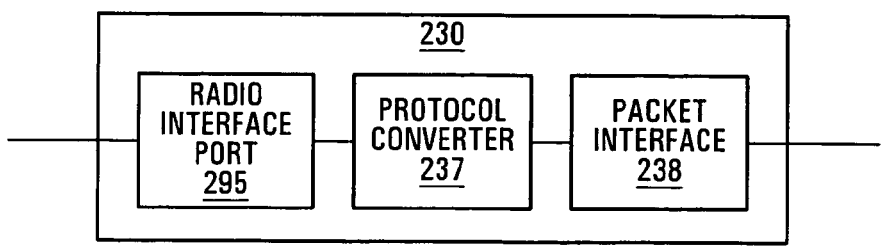
FIG. 2 is a block diagram of one embodiment of the radio gateway of the present invention.

FIG. 2 is a block diagram of a gateway provided by an embodiment of the present invention. The gateway comprises a radio interface port 295 for receiving signals from a radio system. The radio interface port 295 is connected to a protocol converter 237, which is in turn connected to a packet interface 238. The packet interface 238 is connectable for communication with a packet network. In some embodiments the packet interface 238 is modular. I.e. different packet interface modules may be chosen as appropriate for whatever application in which the gateway is to be used.

In operation, the protocol converter 237 converts the audio and signalling received from the radio system into a generic protocol for transmission over the packet network and converts generic radio control signals received from the packet network to audio and signalling in a format understandable by the radio system. In some embodiments, the protocol converter performs audio processing which can include vocoding, generating tone signalling, encoding and decoding data packets, adjusting audio level, and filtering audio. The protocol converter can be any appropriate software, hardware or combinations thereof. Specific examples are provided below with reference to FIG. 5.

Figure 3:
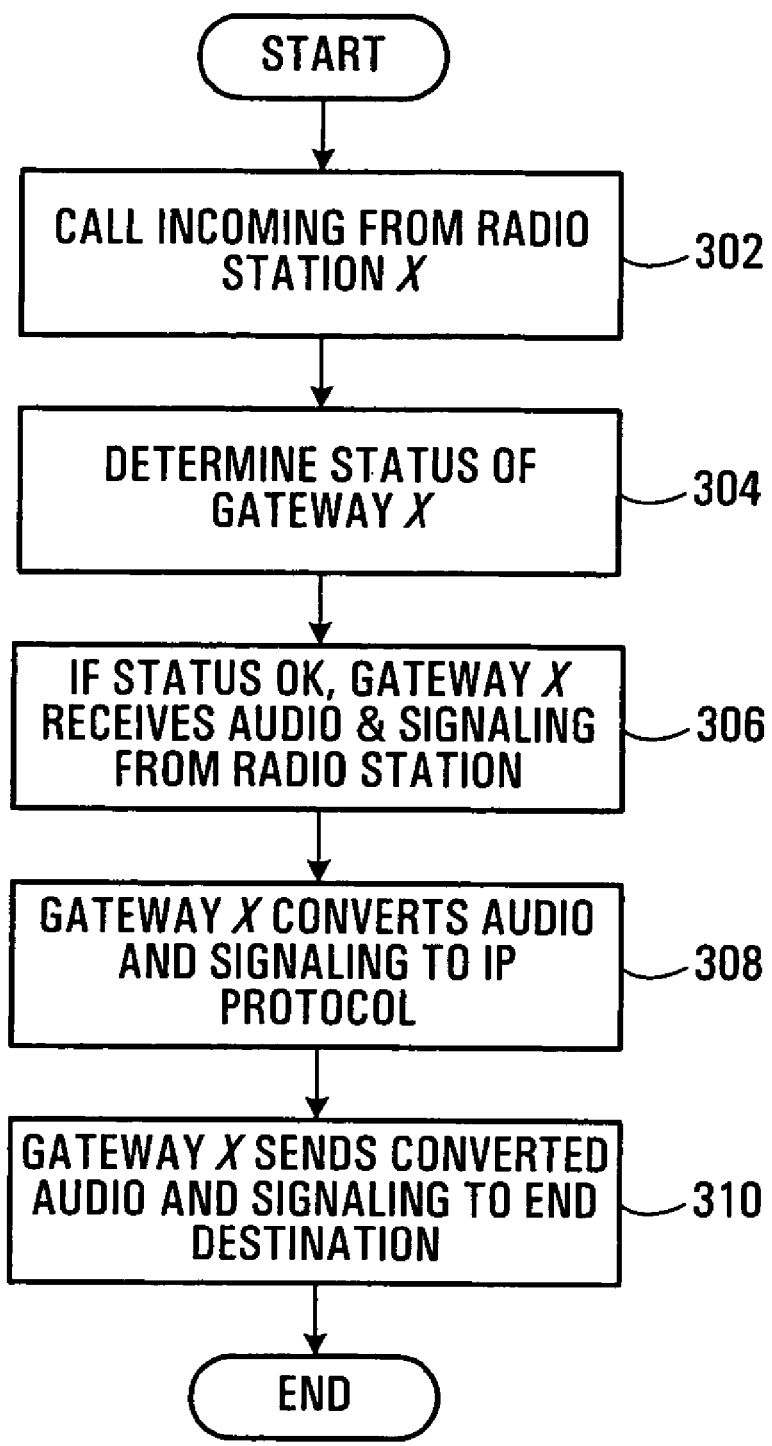
FIG. 3 is a flowchart of a method provided by an embodiment of the present invention.

FIG. 3 is a flowchart of a method according to the present invention. A call is sent from station X to an end destination through gateway X (Step 302). The status of gateway X is determined (Step 304). In some embodiments, the status of the gateway is negotiated with a controller based on periodic status messages sent from the gateway to the controller and from the controller to the gateway. In some embodiments multiple gateways are connected in parallel to the radio station X. Only one gateway is active at a time and the active gateway will process the call. Therefore, if gateway X is active, the gateway x receives audio and signalling from the radio station (Step 306). Gateway X then converts the audio and the signalling received from the radio system into a generic packet protocol independent of radio type (Step 308). In some embodiments, the packets are made up of audio packets and signalling packets. The packets are then sent to the end destination through a packet network (Step 310). In some embodiments, a controller assigns an IP address or channel for the gateway to use. The IP address can be static or dynamic.

Figure 4:
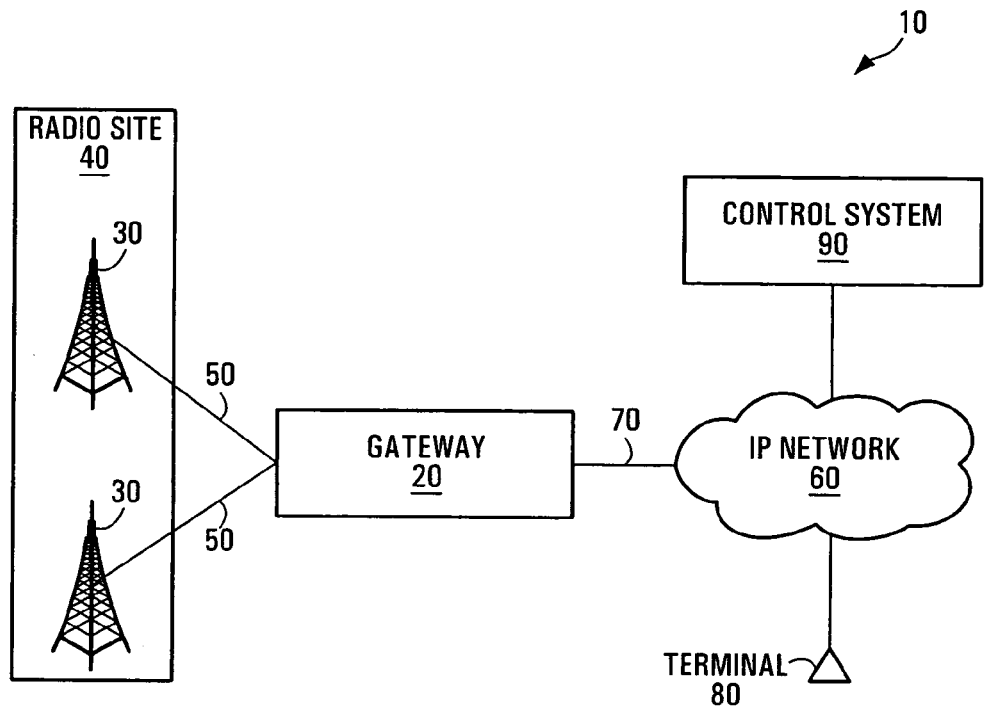
FIG. 4 is a schematic drawing of a system provided by an embodiment of the present invention.

Referring to FIG. 4, this figure depicts a schematic drawing of an exemplary system 10, comprised of a radio gateway 20 connected to a plurality of radio stations 30 via radio interfaces 50. The radio stations 30 are located in a radio site 40. In some embodiments, the radio stations are base stations or repeater stations. Gateway 20 is also connected to an IP network 60 over an IP link 70. Also connected to the IP network 60 are a terminal 80, such as an operator console, and a control system 90.

In some embodiments of the invention, the system 10 is a land mobile radio system, such a police dispatch system, an emergency dispatch system like 911 or a taxi cab dispatch system.

In operation, the gateway 20 translates the audio and signalling used over radio interface 50, which is specific to radio stations 30, into a format that is compatible for use over the IP link 70. This translation facilitates the signalling with control system 90 and thus, allows the control system 90 to control the radio station 30. It also enables the audio to be interfaced with terminal 80, thus allowing a radio conversation to occur.

As stated before, the radio interface 50 is specific to radio stations 30. In some embodiments, the radio interface 50 includes an audio interface and a signalling interface.

In a given system, there will be multiple different gateway types, each gateway type converting between a gateway-type-specific audio and control interface combination, and the generic protocol. Several specific audio and control interface examples follow. The particular gateways included in a given system are system/application specific, depending on the nature of the radio sites included. Different gateways configured for different protocols may support many audio interface variants, including:

A "two-wire" interface, where the audio originating from a radio station 30 and the audio originating from the terminal 80 are duplexed over the same audio path. A duplex method can include "half-duplex" communications, where conversation alternates from one direction to the other, or "duplex" communications, where conversation can simultaneously flow in both directions; and A "four-wire" interface, where the audio originating from a radio station 30 and the audio originating from the terminal 80 use separate audio paths.

For the purpose of discussing the illustrative embodiment, and without limiting the invention to such exemplary embodiment, the radio gateway 20 can support many signalling interface variants, including:

A "local" interface, where discrete digital control lines are used to control the specific radio station 30 functions. In some embodiments, these digital control lines include a line to activate a transmitter in radio station 30, a line to disable a coded squelch feature in a radio station 30, and a line to obtain the carrier status of a radio station 30;

A "DC" interface, where a DC signal is superimposed on the audio interface component of the radio interface 50. In some embodiments, this DC signal is in the form of a regulated current, where a specific current value specifies a function, such as activating the transmitter in a radio station 30, disabling coded squelch in a radio station 30, or tuning a radio station 30 to a different RF channel;

A variant of the "DC" interface also exists where the DC signal is not superimposed on the audio interface, but utilizes a distinct interface; this is typically used with a "four-wire" audio interface and is then termed a "six-wire DC" interface;

A "tone" interface, where a series of tones are superimposed on the audio interface component of the radio interface 50. In some embodiments, this series of tones may be in the form of a guard tone, which is of preset frequency, amplitude and duration; and function tone, which is of preset amplitude and duration but where a specific frequency value specifies a function, such as activating a transmitter in a radio station 30, disabling coded squelch in a radio station 30, or tuning a radio station 30 to a different RF channel;

A variant of the "tone" interface also exists where the tone signal is not superimposed on the audio interface, but utilizes a distinct interface; this is typically used with a "four wire" audio interface and is then termed a "six-wire tone" interface; and A "digital" interface, where a character-based interface, such as an asynchronous serial link, supports a message-based interface for controlling functions, such as activating a transmitter in a radio station 30, disabling coded squelch in a radio station 30, or tuning a radio station 30 to a different RF channel.

A generic protocol is used on IP link 70. The generic protocol can include events to be implemented over the IP link. Examples of events that can be included in the generic protocol are:

Activating a transmitter in a radio station 30;
Releasing a transmitter in a radio station 30;
Enabling coded squelch in a radio station 30;
Disabling coded squelch in a radio station 30;
Tuning a transmitter in a radio station 30 to a specific RF channel;
Switching a receiver in a radio station 30 to a specific RF channel;
Selecting a specific coded squelch frequency in a radio station 30;
Monitoring the carrier status of a radio station 30;
Sending a data packet (e.g. unit ID) to a specific subscriber unit via a radio station 30;
Receiving a data packet (e.g. unit ID) from a specific subscriber unit via a radio station 30; and
Sending a paging alert tone to a specific subscriber unit via a radio station 30.

Of course, these are mere examples. Other events are possible.

In some embodiments, the IP link 70 utilizes a control protocol and an audio protocol. The control protocol, such as the MGCP 1.0 (RFC 3435) or MEGACO 1.0 (RFC 3015) protocols, and future versions and variants thereof, can define specific packages. A package is a set of events and signals related to a specific interface. In some embodiments, these packages logically divide the signalling interface component of a radio interface 50 into a series of events.

An example of a signal that can be sent from a controller to a gateway is a Push-to-talk signal. The gateway converts the generic push-to-talk signal into the appropriate signal for the respective radio station, such as tone, local, DC or digital.

The audio protocol can define a payload format such as RTP (RFC 3550). The payload format will vary with the specific voice encoding used. Examples of voice encoding used in various embodiments include: ITU G.711; ITU G.723.1; ITU G.729; ETSI (European Telecommunication Standard Institute) GSM (Global System for Mobile Communications); DVSI (Digital Voice Systems, Inc) IMBE (Improved MultiBand Excitation); and ETSI TETRA (Terrestrial Trunked Radio). Of course, these are mere examples and other encodings are possible.

Figure 5:
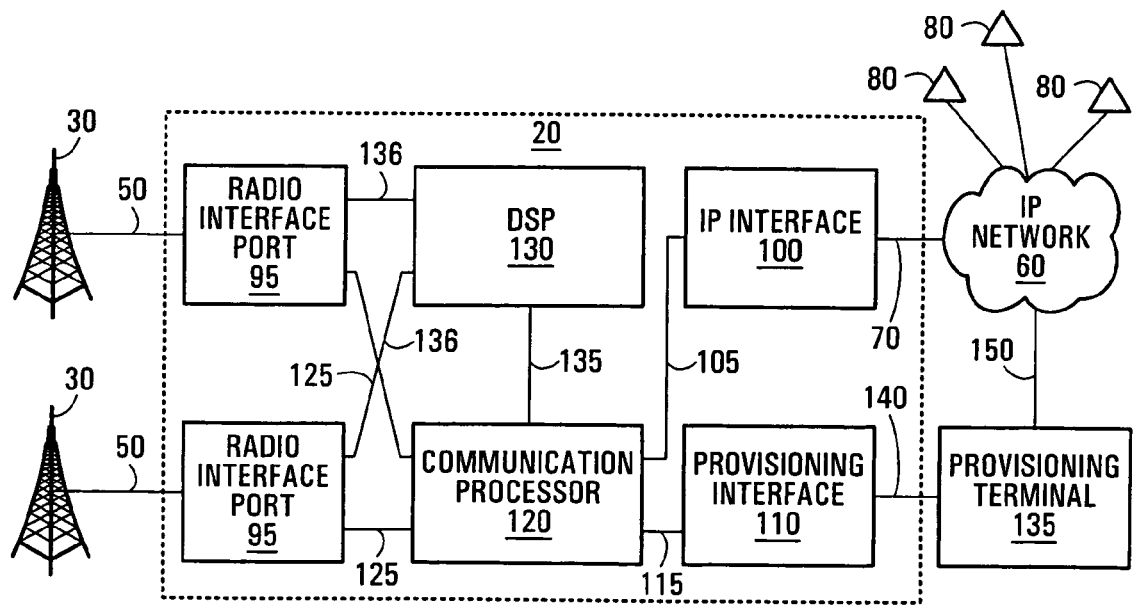
FIG. 5 is a schematic drawing of another embodiment of a radio gateway.

FIG. 5 schematically depicts an embodiment of radio gateway 20, comprised of a plurality of radio interface ports 95, an IP interface 100, a provisioning interface 110, a communication processor 120 and a digital signal processor 130. The radio interface ports 95 communicate over and in accordance with the radio interface 50 for connection to the radio stations 30. Each radio interface port 95 is also in communication with the digital signal processor 130 via interface 136 and the communication processor 120 via interface 125. The digital signal processor 130 is also in communication with the communication processor 120 via interface 135. The communication processor is in communication with the IP interface 100 via interface 105 and the provisioning interface 110 via interface 115.

In FIG. 5, the digital signal processor 130 and the communication processor 120 are shown as separate components. In those cases, interface 135 is an interprocessor bus, such as Host Port Interface or PCI. In some embodiments, the digital signal processor and the communication processor are collocated on a single processor. Preferably, the digital signal processor and the communication processor functions are embedded into a single SoC (System on Chip) processor.

The interface 125 between the radio interface port 95 and the communication processor 120 varies according to the radio system. In some embodiments, the interface 125 is via discrete input/output signals. Preferably, the interface 105 between the communication processor 120 and the IP interface 100 is a MII (Media Independent Interface). The interface 115 between the communication processor 120 and the provisioning interface 110 is preferably an asynchronous serial interface.

The IP interface 100 communicates over and in accordance with the IP link 70 for connection to the IP network 60. The provisioning interface 110 communicates over and in accordance with the provisioning link 140 for operatively connecting to the provisioning terminal 135. The provisioning terminal 135 can be used for initial provisioning of the radio gateway 20. In some embodiments the provisioning link 140 is a terminal interface. In some embodiments, provisioning of the radio gateway 20 includes assigning an IP address to the gateway. Once initial provisioning is complete, subsequent provisioning can be performed via the IP link 70, assuming the provisioning terminal 135 is operatively connected to the IP network 60 via IP link 150.

The digital signal processor 130 performs audio processing functions used within the gateway 20. In various embodiments, the audio processing includes any of the following functions: vocoding to the desired voice encoding; generating tone signalling, encoding and decoding data packets towards the radio; audio level adjustment; and audio filtering. The audio functions are not limited to this list. Preferably, the digital signal processor 130 takes audio from the radio interface port 95 in analog form and converts it into pulse code modulation signals using a CODEC.

The communication processor 120 communicates over and in accordance with the protocols used over the IP link 70 through IP interface 100. In some embodiments the protocols used over IP link 70 are chosen from but are not limited to TCP/IP protocol, the RTP, MGCP and MEGACO protocols. The communications processor also controls the radio interface ports 95 and implements a protocol for the provisioning interface 110.

Different embodiments of the radio gateway 20 are possible, in fixed or modular configurations. For example, a set number of radio interface ports 95 can be part of the radio gateway 20, or the radio interface ports 95 can be a modular add-onto the radio gateway 20.

Figure 6:
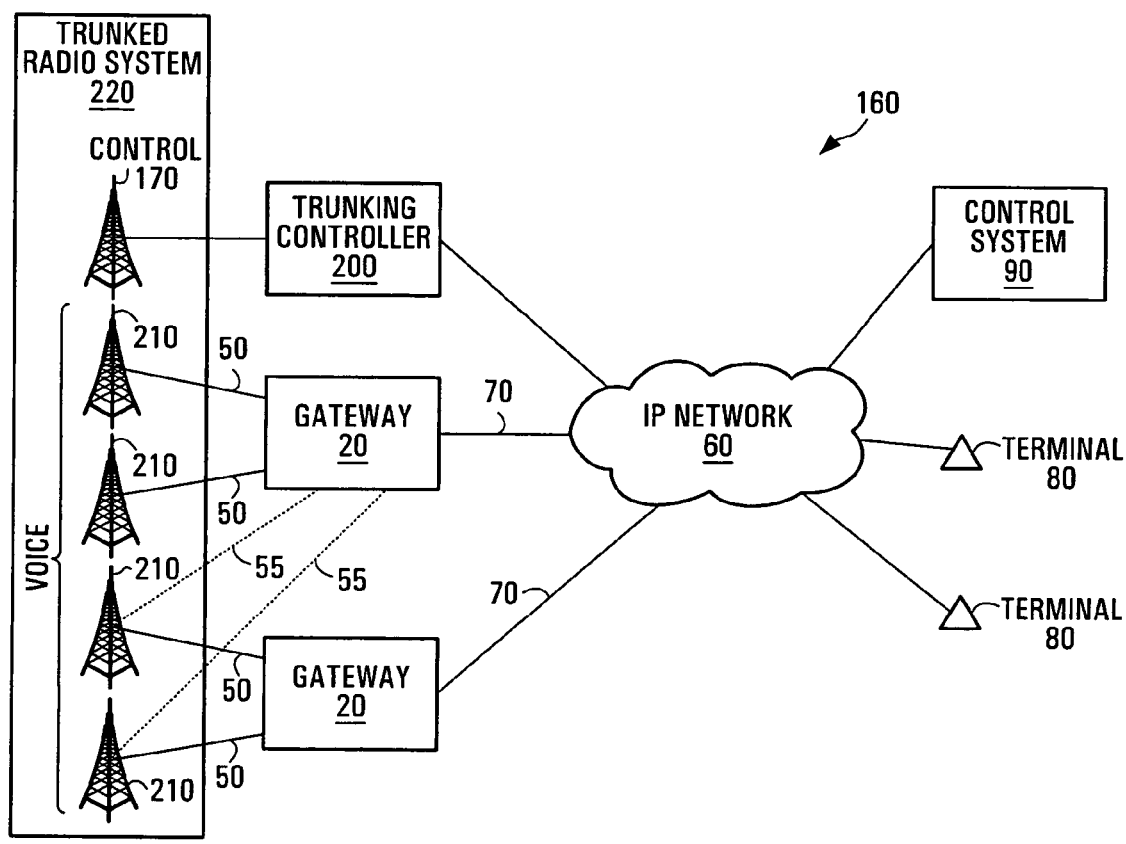
FIG. 6 is a schematic drawing of a system provided by an embodiment of the present invention.

Of course, in addition to the system in FIG. 4, the radio gateway 20 can be used in other systems. FIG. 6 schematically depicts an exemplary system 160 embodying the present invention. Referring to FIG. 6, the exemplary system 160 includes: a trunked radio system 220; a control radio station 170 operatively connected to a trunking controller 200; voice radio stations 210 operatively connected to radio gateways 20 over radio interfaces 50; an IP network 60 operatively connecting the radio gateways 20 over IP links 70; terminals 80; and a control system 90. The trunked radio system 220 comprises the control radio station 170 and the voice radio stations 210.

In the system 160, the control system 90, in addition to controlling a plurality of radio gateways 20, works in parallel with a trunking controller 200 to create a system where assignment of radio stations 210 is dynamic.

In some embodiments, the control system 90 comprises means for controlling or managing communication between radio systems in a distributed manner using a packet network.

In a preferred embodiment, the control system 90 comprises a plurality of distributed call management modules, such as described earlier with reference to FIG. 4. In such embodiments, the generic protocol is understood by the distributed call management modules. A single design of the distributed call management module can be used to service multiple radio types.

Also, as shown by the dotted lines 55 in FIG. 6, the radio interfaces 50 can be duplicated across multiple radio gateways 20 to provide redundancy, where of course, only one of the plurality of radio interfaces to a given radio gateway 20 is active at a given time. Such activation can be achieved as described below.

In accordance with an aspect of the present invention, an IP interface reports the status of a radio gateway 20 over an IP network 60 to a control system 90. There are many ways this status can be provided in various embodiments. For example, the IP interface can periodically report the status or it can report the status in response to an inquiry from control system 90. Based on the reported status from the various radio gateways 20, the control system 90 selects a radio gateway 20 to use to control a given radio station. Of course, as will be recognized, the given radio station must be able to communicate with the selected radio gateway. In various embodiments, this communication is either direct or indirect. Indirect communication can be via intermediate equipment or the IP network.

In some embodiments, the radio gateways assume an inactive status on their respective radio interface by default, until ordered to become active by the control system. To assist the control system in electing a radio gateway to become active, the radio gateways send a periodic status message to the control system over IP links. The status message contains information on the health of the radio gateway. The control system can use this status message to determine which radio gateways should be inactive and which should be active. The order to become active or inactive is via a message from control system to radio gateways. In some embodiments, the control system sends a periodic status message to the radio gateways, to ensure that only one radio gateway is active at any given time. Upon failure to receive the status message for a set time interval, the radio gateway will automatically become inactive. There are of course many other ways of activating and deactivating radio gateways, and the present invention does not depend upon and is not limited to any particular way.

In the above, a radio interface can be operatively connected to multiple radio gateways. With such a connection structure, the radio stations can be multi-frequency based stations. For example, a radio station can include individual receivers for each of the frequencies, and share a transmitter for all of the frequencies.

What has been described is merely illustrative of the application of the principles of the invention. Other arrangements and methods can be implemented by those skilled in the art without departing from the spirit and scope of the present invention.

The invention claimed is:

1. A communication system including at least one controller for enabling a plurality of radio systems to communicate over a packet network, each radio system communicating one of at least two different radio signals transmitted using different radio protocols, the communication system comprising:

a plurality of gateways adapted to communicate over an IP link using a generic IP data packet protocol having a component for storing audio signals and a component for storing radio control signals;

for each radio signal of the at least two radio signals:
at least one gateway of the plurality of gateways converting audio and control protocol signals in the radio protocols to and from audio and control components of the generic IP data packet protocol for at least one radio system that communicates using the radio signal; and wherein the component of the generic IP data packet protocol for storing radio control signals is configured to store at least one event selected from a group consisting of:
enabling coded squelch in a radio station;
disabling coded squelch in a radio station; and
selecting a specific coded squelch frequency in a radio station.

2. The communication system of claim 1, wherein the component of the generic IP data packet protocol for storing radio control signals is configured to store at least one events selected from a group consisting of:
activating a transmitter in a radio station;
releasing a transmitter in a radio station;
tuning a transmitter in a radio station to a specific RF channel
switching a receiver in a radio station to a specific RF channel;
monitoring the carrier status of a radio station;
sending a data packet to a specific subscriber unit via a radio station; and
receiving a data packet from a specific subscriber unit via a radio station.

3. The communication system of claim 1, further comprising a control system for determining if a gateway in the plurality of gateways is active and directing communications to and from at least one radio system through the gateway if the gateway is active.

4. The communication system of claim 3, wherein the control system comprises a plurality of distributed call management modules, each distributed call management module configured to understand the generic protocol.

5. The communication system of claim 4, wherein at least one gateway communicates with the packet network through at least one distributed call management module.

6. The communication system of claim 5, wherein the at least one gateway is hardwire connected to the at least one distributed call management module.

7. The communication system of claim 5, further comprising a LAN (Local Area Network) between the at least one gateway and the distributed call management module.

8. The communication system of claim 1, further comprising the plurality of radio systems.

9. The communication system of claim 8, wherein each radio system comprises a plurality of radio stations, each radio station in communication with at least one gateway.

10. The communication system of claim 8, further comprising the packet network.

11. The communications system of claim 1, wherein the component of the generic IP data packet protocol for storing radio control signals is configured to store at least the event of sending a paging alert tone to a specific subscriber unit via a radio station.

12. A gateway comprising:
a radio interface port connectable to communicate with a radio system;
a packet interface operable to send and receive packet signals; and a protocol converter adapted to convert audio and control protocol signals in radio protocols received from the radio system via the radio interface port into IP based packet signals in a generic IP data packet protocol having a component for storing the audio signals and a component for storing the radio control signals and to convert IP based packet signals in the generic IP data packet protocol received via the packet interface into the audio and control protocol signals communicated by the radio system;

wherein the component of the generic IP data packet protocol for storing radio control signals is configured to store at least one event selected from a group consisting of:
enabling coded squelch in a radio station;
disabling coded squelch in a radio station;
selecting a specific coded squelch frequency in a radio station; and
sending a paging alert tone to a specific subscriber unit via a radio station.

13. The gateway of claim 12, wherein the component of the generic IP data packet protocol for storing radio control signals is configured to store at least-one event selected from a group consisting of:
activating a transmitter in a radio station;
releasing a transmitter in a radio station;
turning a transmitter in a radio station to a specific RF channel;
switching a receiver in a radio station to a specific RF channel;
monitoring the carrier status of a radio station;
sending a data packet to a specific subscriber unit via a radio station; and
receiving a data packet from a specific subscriber unit via a radio station.

14. The gateway of claim 12, further comprising a plurality of radio interface ports, each radio interface port operatively connectable to communicate with at least one radio station within the radio system.

15. The gateway of claim 12, wherein the packet interface is connectable to communicate over a LAN (Local Area Network).

16. The gateway of claim 12, wherein the packet interface is connectable to communicate over an IP (Internet Protocol) network.

17. The gateway of claim 12, wherein the packet interface provides a status of the radio gateway to a control system.

18. The gateway of claim 12, wherein the packet interface sends and receives packet signals in accordance with a MGCP (Media Gateway Control Protocol).

19. The gateway of claim 12, wherein the interface sends and receives packet signals in accordance with a MEGACO (Media Gateway Control) protocol.

20. The gateway of claim 12, wherein the packet interface sends and receives packet signals in accordance with an RTP (Real Time Protocol) audio protocol.

21. The gateway of claim 12, wherein the packet interface sends and receives packet signals in accordance with an audio protocol including packets in accordance with any one of G. 711, G. 723, G. 729, GSM (Global System for Mobile Communications), IMBE (Improved MultiBand Excitation) and TETRA (Terrestrial Trunked Radio) formats.

22. The gateway of claim 12, wherein the protocol converter comprises a digital signal processor and a communication processor.

23. The gateway of claim 22 further comprising a provisioning interface operatively connectable to communicate with a provisioning terminal.

24. A method of enabling a radio system to communicate via a packet network, said method comprising:
   receiving audio and control protocol signals transmitted from the radio system at a radio gateway;
   converting at least one of the plural audio and control signals into IP based packet signals in a generic IP data packet protocol having a component for storing audio signals and a component for storing radio control signals;
   providing the packet signals in the genetic IP data packet protocol to the packet network for distribution to a desired destination;
   receiving IP based packet signals from the packet network, wherein said IP based packet signals are in the generic IP data packet protocol;
   converting the IP based packet signals from the packet network into non-IP based audio and control protocol signals in a protocol understandable by the radio system; and
   transmitting the converted non-IP based audio and signaling to the radio system, wherein the component of the generic IP data packet protocol for storing radio control signals is configured to store at least one event selected from a group consisting of:
   enabling coded squelch in a radio stations;
   disabling coded squelch in a radio station; and
   selecting a specific coded squelch frequency in a radio station.

25. The method of claim 24, further comprising:
   determining a status of a radio gateway associated with a radio station; and
   selecting the radio gateway to receive and convert audio and signaling from the radio system and to receive and convert packet signals from the packet network if the radio gateway is active.

* * * * *

UNITED STATES PATENT AND TRADEMARK OFFICE
CERTIFICATE OF CORRECTION

PATENT NO. : 7,460,510 B2  Page 1 of 1
APPLICATION NO. : 11/095465
DATED : December 2, 2008
INVENTOR(S) : Pierre Olivier and Douglas Gordon Roberts It is certified that error appears in the above-identified patent and that said Letters Patent is hereby corrected as shown below:

Title page Page 2, Column 2, line 67, delete "Tehnical" and insert -- Technical --

Column 4, line 45, delete "x" and insert -- X --

Column 11, line 13, in Claim 24, delete "genetic" and insert -- generic --

Column 12, line 8, in Claim 24, delete "stations;" and insert -- station; --

Signed and Sealed this

Seventh Day of July, 2009

JOHN DOLL
*Acting Director of the United States Patent and Trademark Office*